(12) United States Patent
Holloway et al.

(10) Patent No.: US 7,756,031 B2
(45) Date of Patent: Jul. 13, 2010

(54) NARROWBAND VOICE SYSTEMS AND METHODS

(76) Inventors: J. Michael Holloway, 10813 Range View Dr., Austin, TX (US) 78730; Samuel R. Shiffman, 9614 Vista View Dr., Austin, TX (US) 78750

( * ) Notice: Subject to any disclaimer, the term of this patent is extended or adjusted under 35 U.S.C. 154(b) by 1154 days.

(21) Appl. No.: 10/944,211

(22) Filed: Sep. 17, 2004

(65) Prior Publication Data
US 2006/0062255 A1 Mar. 23, 2006

(51) Int. Cl.
*H04J 1/16* (2006.01)
(52) U.S. Cl. .................. 370/233; 370/231; 370/235; 370/477
(58) Field of Classification Search ......... 370/229–236, 370/477
See application file for complete search history.

(56) References Cited

U.S. PATENT DOCUMENTS

| | | | |
|---|---|---|---|
| 6,452,924 B1 * | 9/2002 | Golden et al. | 370/352 |
| 7,372,844 B2 * | 5/2008 | Lee | 370/349 |
| 2005/0047340 A1 * | 3/2005 | Babiarz et al. | 370/231 |
| 2006/0045074 A1 * | 3/2006 | Lee | 370/352 |

* cited by examiner

*Primary Examiner*—Jason E Mattis
*Assistant Examiner*—Dady Chery
(74) *Attorney, Agent, or Firm*—The Law Firm of H. Dale Langley, Jr., P.C.

(57) ABSTRACT

Systems and methods for optimizing usage of an available bandwidth for VoIP communications include a communications system, such as the Internet, for carrying the VoIP communication signals. A switch and a bandwidth limiter connected to the switch restrict bandwidth usage by applications other than those required for the VoIP communications. In the system, a modem or other narrowband network interface, a router, a network adapter, and a VoIP element are housed as a unit. The switch turns "on" and "off" the bandwidth limiter, and the bandwidth limiter when "on" restricts bandwidth usage of the adapter. The communications system is a digital data network, and the modem accesses the digital data network via connection of the modem to the network. Features for emergency bypass and external power supplies are included.

13 Claims, 3 Drawing Sheets

NARROWBAND VOICE SYSTEMS AND METHODS

BACKGROUND OF THE INVENTION

The present invention generally relates to packetized digital communications and, more particularly, relates to Voice-over-Internet Protocol (VoIP) network telephony and communications in narrowband environments.

Communications networks require sufficient bandwidth over communications links, such as wires, wireless channels, and other segments, in order to efficiently and sufficiently operate. A relatively recent usage of communications networks includes transmission and reception of digitized voice information. For example, Voice-over-Internet Protocol (VoIP) telephony systems, permitting Internet communication of digitized voice signals, are becoming more widespread and pervasive.

In VoIP operations, analog voice signals are digitized and transmitted as a stream of packets over a digital data communications network, such as the Internet. These systems enable real-time transmission and reception of the voice signals. Various network communications protocols are employed in VoIP operations of these networks, including Transport Control Protocol (TCP), Real-Time Transport Protocol (RTP), User Datagram Protocol (UDP), and other Internet Protocol (IP) and network protocol suites.

Digitization of voice signals, such as in VoIP systems, generally results in quite substantial volumes of digital information. Communications networks employed in communicating digitized voice signals must, therefore, have sufficiently extensive bandwidth to carry the substantial volumes. Although so-called broadband networks are increasing in popularity, a large number of digital network communications continue to occur over more narrowband channels and networks, such as over twisted-pair telephone wires of the plain old telephone system (POTS) and the like.

Dial-up digital network access, such as with AOL and other providers, typically is considered narrowband in capacity, because of limitations of the physical wires and connections for transmissions and receptions. Even other broadband access connections are capacity-limited, particularly when multiple simultaneous communications are carried over the same lines and links in the systems. Local area and wide area networks of components and devices are generally tied to common gateways and access connections, and these gateways and connections, themselves, have bandwidth limits that can prove restrictive when multiple communications are simultaneously being carried.

The communications capacity limitations of conventional networks and connections, particularly with dial-up access but also with others, are problematic when large volumes of information are sought to be concurrently communicated via the networks and connections. The problems are particularly apparent where VoIP data is communicated, because of the large amounts of data required in the communications. Thus, the operation and availability of VoIP communications capability and usages can be restricted or prohibited in certain systems, particularly those providing narrower bandwidth capacities for the communications.

It would be advantageous in the art and technology to provide new and innovative systems and methods for enabling VoIP and similar large-volume information to be communicated over bandwidth-limited networks. Additionally, it would be a significant advance and improvement to provide relatively simple and inexpensive equipment and mechanisms to further the enabling. The present invention provides systems and methods for VoIP and other types of communications in bandwidth-limited networks, such as with dial-up Internet access and the like. Furthermore, the present invention provides numerous other advantages and improvements in the art and technology.

SUMMARY OF THE INVENTION

An embodiment of the invention is a system for restricting a bandwidth usage of a communications system. The system includes a switch and a bandwidth limiter connected to the switch.

Another embodiment of the invention is a method of communications. The method includes limiting a competing bandwidth usage.

Yet another embodiment of the invention is a method of VoIP communications in a network. The network has a narrow bandwidth capacity. The method includes receiving a signal from the network, interfacing to the signal, optimizing a bandwidth usage for the signal, and converting the signal to an analog sound.

Another embodiment of the invention is a method of VoIP communications in a network. The network has a narrow bandwidth capacity. The method includes inputting an analog voice signal, converting the analog voice signal to a digital data, optimizing a bandwidth usage for communications of the digital data, and transmitting the digital data.

BRIEF DESCRIPTION OF THE DRAWINGS

The present invention is illustrated by way of example and not limitation in the accompanying figures, in which like references indicate similar elements, and in which.

DETAILED DESCRIPTION OF THE INVENTION

Figure 1:
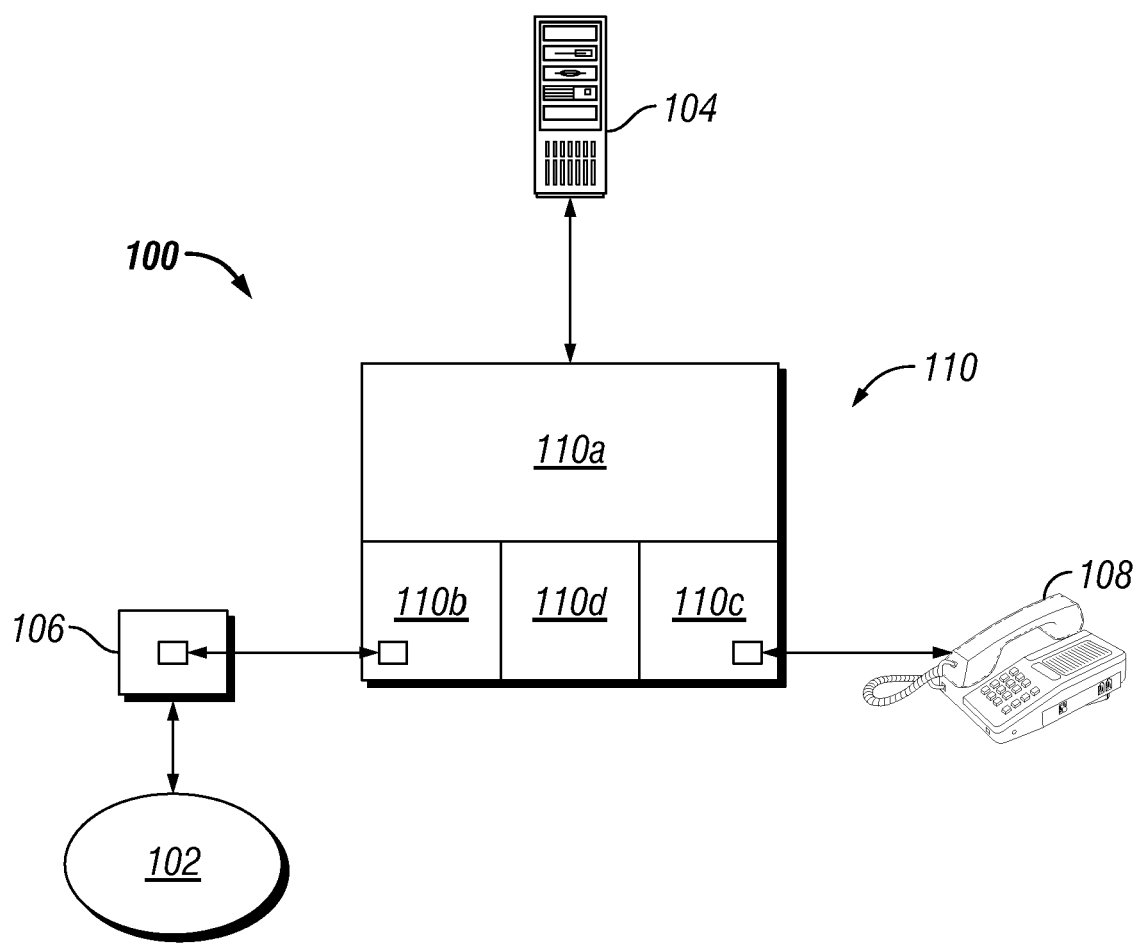
FIG. 1 illustrates a system for communications including a network interface device connected to a communications network, a digital communications device, and an analog communications device, the network interface device limiting a bandwidth for communications by the digital communications device whenever the analog communications device is communicating over the network, according to certain embodiments of the invention.

Referring to FIG. 1, a system 100 for communications includes a digital data network 102 communicatively connected to a digital data communications device 104. The network 102 communicatively connects to a jack 106, for example, a telephone line wall jack locally situated near the communications device 104. A network interface device 110 communicatively connects to the jack. The interface device 110 also communicatively connects to the communications device 104 and also to an analog voice device 108, such as an analog telephone.

The communicative connections between the various elements can be wire, wireless, optical, cable, or any other of a wide variety of present or future communications segments or links. The network 102 is, for example, the Internet or some other wide area digital packetized communications system network. The jack 106 connects to the network 102 through twisted-pair wire of the POTS or otherwise connects to the network 102 in conventional manner wherein the bandwidth available for communications between the jack 106 and the network 102 has capacity limitations that can or could affect desired communications. The communications device 104 is, for example, a computer, laptop, PDA, or other digital communications device capable of transmitting and receiving packetized digital data. The communications device 104 connects by wire, wireless or other link to the interface device 110. The voice device 108 is, for example, a common analog telephone, microphone, or other analog voice input equipment, that connects to the interface device 104 by wire, wireless or other link for carrying signals, for example, analog or other signals.

The interface device 110 comprises a LAN/WAN adapter 110a for connection to and communications to and from the communications device 104. The interface device 110 also comprises a modem 110b for connection to and communications to and from the jack 106 and the network 102 connected therewith. A VoIP element 110c is included in the interface device 110. The VoIP element 110c connects to and communicates to and from the voice device 108. A router 110d of the interface device 110 interconnects the modem 110b and VoIP element 110c, and also the adapter 110a, for electrical or other communicative connection and communications therebetween.

The interface device 110 is, for example, a printed circuit board (PCB) containing electrical circuitry and functional elements for communicating and performing the functions of the adapter 110a, the modem 110b, the VoIP element 110c and the router 110d. The interface device 110 is contained within a housing to protect the PCB and elements. Alternatively, the interface device 110 can be comprised of separate elements, housings, and functionalities and circuitry connections. In every event, the interface device 110 comprises all of the functionalities and intercommunications therebetween as herein described.

Figure 2:
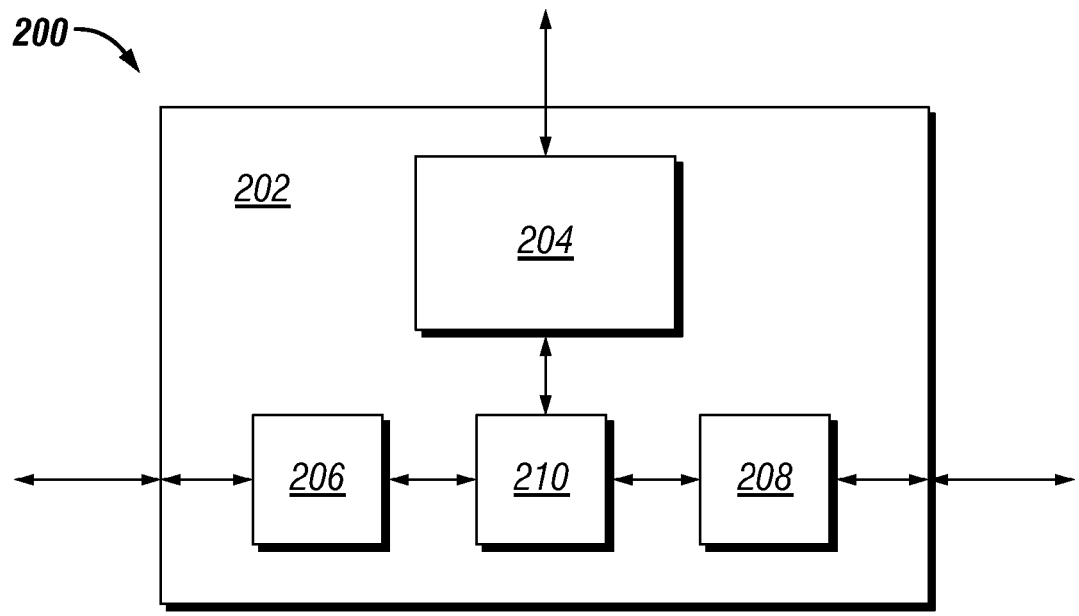
FIG. 2 illustrates a system connected to a communications network and a digital communications device and analog communications device, for limiting a bandwidth usage by the digital device when the analog communications device is in use in VoIP communications over the network, according to certain embodiments of the invention.

Referring to FIG. 2, the interface device 110 of FIG. 1 is more particularly detailed in a system 200. As so detailed, the system 200 comprises a circuit board 202. The circuit board 202 incorporates a digital device adapter 204. The adapter 204 is a network card (e.g., a 10/100 Mb Ethernet adapter) or similar interface connector device, that allows connection of a digital communicator, such as the digital communications device 104 of FIG. 1, to the system 200.

The system 200 also includes a modulator/demodulator (modem) 206 of the system 200 incorporated in the circuit board 202. The modem 206 is an analog-to-digital and digital-to-analog converter device. As is conventional, the modem 206 permits analog communications of digital packetized data to and from any there-connected jack 106 and network 102 of FIG. 1 and digital communications to and from other aspects of the system 200 and any there-connected digital or analog devices or elements. The modem 206 is, for example, a 56 k v.92 or similar or alternative modem device or other narrowband network adaptor.

VoIP element 208 of the system 200 is incorporated in the circuit board 202 to communicatively connect to the other elements of the system 200. The VoIP element connects externally to the system 200 to an analog voice input, such as an analog telephone, a microphone, or other analog voice input such as the voice device 108 of FIG. 1. The VoIP element 208 includes a signal processor, such as a digital signal processor, a microprocessor or other logic circuitry and elements, to convert analog signals input by the analog voice input to the system 200, to digital data representative of the analog voice signals.

The system 200 also includes a router 210. The router 210 is incorporated in the circuit board 202 and connects to the device adapter 204, the modem 206, and VoIP element 208. The router 210 functions to direct respective signals communicated from and to the system 200 (including, without limitation, from and to the adapter 204, the modem 206 and the VoIP element 208) to the various elements of the system 200 and also to external elements in communicative connection with the system 200 (e.g., including, without limitation, any communications from or to the network 102 via the jack 106 of FIG. 1 or the communications device 104 or similar device. The router 210 conforms to particular communications protocols and networking interface hierarchy arrangement for the network 102 and any WAN/LAN system (e.g., illustrated by the communications device 104) of FIG. 1. For example, the router 210 directs communications according to IP addresses and Open System Interconnect (OSI) protocols, such as TCP/IP, for communicatively connected devices and aspects of the network and similarly receives communications according to the IP address(es) and OSI protocols for the system 200 and its connected devices and aspects.

Figure 3:
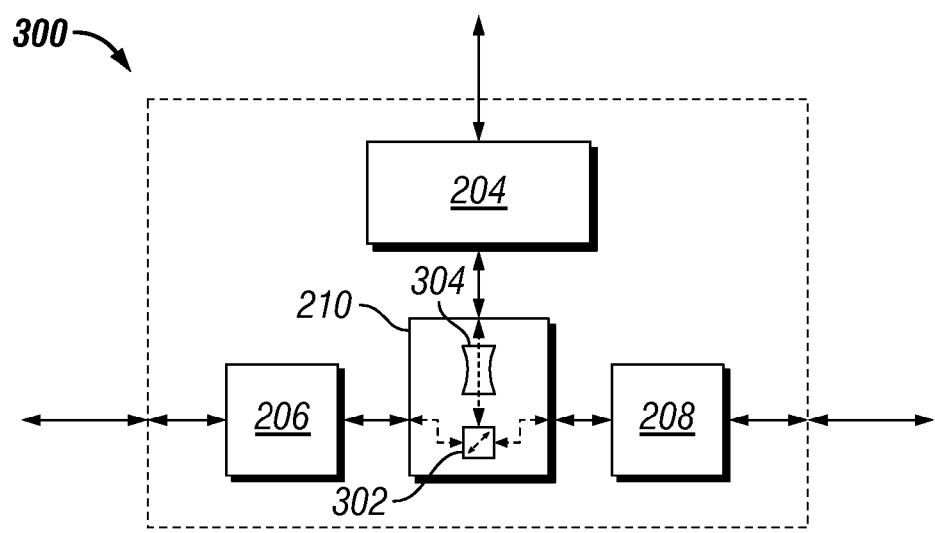
FIG. 3 illustrates a system substantially like that of FIG. 2, wherein the system includes a router and a switch and the router controls the switch to activate a bandwidth limiter, according to certain embodiments of the invention.

Referring to FIG. 3, a system 300, of the type of the system 200 of FIG. 2 and the interface device 110 of FIG. 1, includes a bandwidth limiter 304. The bandwidth limiter 304 is, for example, included in the router 210. The router 210 also includes a switch 302. The bandwidth limiter 304 is circuitry and elements of the router 210 that serves to limit a communications bandwidth of the interconnection of the router 210 and the adapter 204. The switch 302 of the router 210 serves to switch "on" or "off", as applicable, the bandwidth limiter 304.

In operations of the system 300, the router 210 will handle communications received by the system 300 at the modem 206 from the network 102 (shown in FIG. 1). The router 210 will also handle communications within the system 300, occurring between the adapter 204 and the router 210 and also between the router 210 and the VoIP element 208. Of course, the VoIP element 208 can, at any instant, receive input from the voice device 108 of FIG. 1 via the connection of the voice device 108 to the system 300.

The router 210 operates to switch the bandwidth limiter 304 to "on" whenever any analog voice input, such as from a telephone connected to the VoIP element 208, is transmitted to and received by the VoIP element 208 of the system 300. For example, a user of an analog telephone connected to the VoIP element 208 as the voice input, can initiate a voice call or other analog communication from the telephone to the VoIP element 208. When the VoIP element 208 senses the incoming analog signal, the router 210 switches "on" the bandwidth limiter 304. The bandwidth limiter 304 then limits the extent of the capacity of signaled information that may then be communicated between the router 210 and the adapter 204. In effect, a maximal or optimum bandwidth of the system 300 via the router 210 is then made available to handle the voice input that is received at the VoIP element 208. Of course, the VoIP element 208 converts the analog voice signal to a digitized data, and then the router 210 in conjunction with the modem 206 operates to communicate the digitized data (according to applicable protocols and formats) by the system 300 to the network 102 via the jack 106 (or whatever the particular connection and external communications system may be, as applicable).

Similarly, when any VoIP signal is received by the system 300 at the modem 206, the router 210 switches "on" the bandwidth limiter 304. The bandwidth limiter 304 then also limits the extent of the capacity of signaled information to and from the adapter 204 and router 210, and maximizes or optimizes the bandwidth available between the router 210 and the VoIP element 208 for handling the VoIP signal. The VoIP element 208 receives the VoIP signal and translates the signal to analog voice output. The VoIP element 208, via its connection to an analog voice output, such as the device 108 of FIG. 1, allows analog output of sound or other analog signals to a user or other.

In effect, the system 300 controls usage of available bandwidth to enable VoIP calls (or similar large amounts of data to be communicated) even where bandwidth limitations may affect the capability because of other concurrent usages of the applicable bandwidth. The system 300 effectively restricts bandwidth usage by other applications, whenever any VoIP or other similar large-volume data usage is presented. Even in narrower bandwidth connections, therefore, the system 300 permits optimization of usage of the available bandwidth for VoIP calls and the like.

Figure 4:
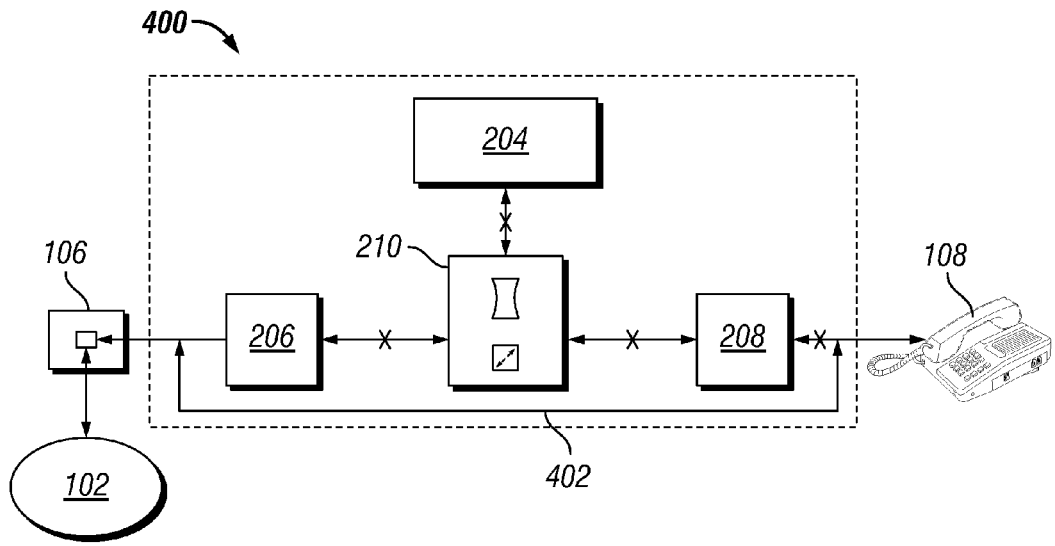
FIG. 4 illustrates a system substantially like that of FIG. 3, and further including a bypass connection for connecting a telephone directly to the communications network for effecting an analog voice communication over the network, according to certain embodiments of the invention.

Referring to FIG. 4, a system 400, similar to the systems 200 and 300 of FIGS. 2 and 3 and to the interface device 110 of FIG. 1, comprises a failsafe bypass 402. The failsafe bypass 402 provides a direct electrical connection of the analog voice input device, such as a telephone 108, to the network 102 via the wall jack 106. The failsafe bypass 402 operates only if and when the data communications network access by the system 400 is unavailable. In any such instance, the analog telephone 108 communicates directly through to and from the POTS network 102, with bypass of all other elements and aspects of the system 400.

In operation, upon a failure of access by the system 400 to the data communications network (e.g., when an Internet connection is not available), the failsafe bypass 402 is switched by the system 400 to electrically directly connect the telephone 108 to the jack 106 and network 102. Then, any voice calls made by or to a user via the telephone 108, are communicated solely as analog signals between the telephone 108 and the jack 106 and network 102. In effect, the failsafe bypass 402 operates in such instance to treat the voice calls as if the entire system 300 (shown in FIG. 3) is not present or operable. If and when data communications network access is available to the system 400, however, the system 400 functions substantially as described with respect to the system 300 of FIG. 3, with the adapter 204, the modem 206, the VoIP element 208 and the router 210. In certain embodiments, the failsafe bypass 402 operates in the event of a "911" call by the user via the telephone 108 or similar event in which analog telephone services are desired for the call.

Figure 5:
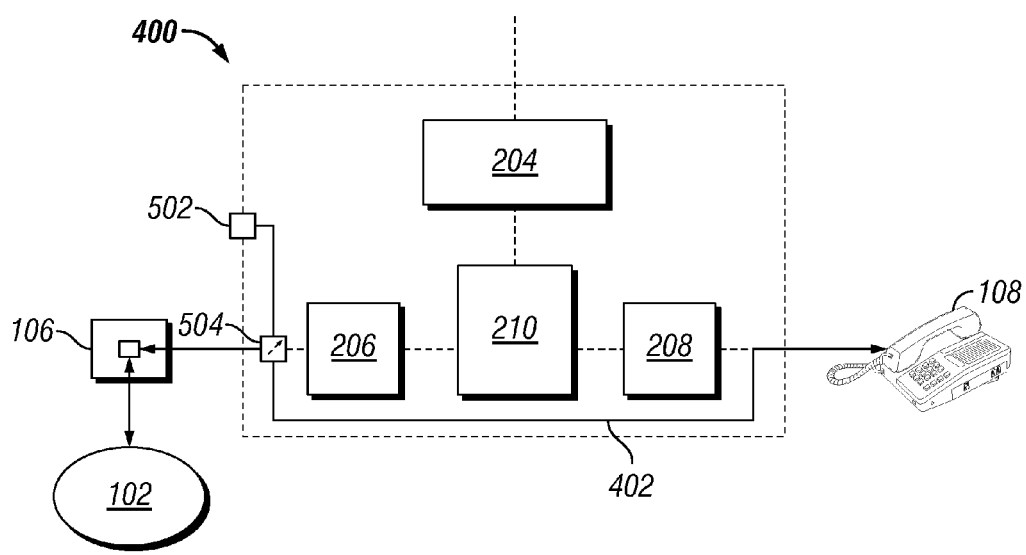
FIG. 5 illustrates a system substantially like that of FIG. 4, and further including a power source for operating the bypass connection upon a failure of an external power to the system, such as from a utility power outage at a location of the system, according to certain embodiments of the invention.

Referring to FIG. 5, a system 500 is substantially similar to the system 400 of FIG. 4, except that the system 500 provides an additional failsafe of a power input 502. The power input 502 is, for example, a DC power supply such as a battery or, alternatively, another power input to the system 500. The system 500 includes a switch 504 for switching to the power input 502 upon desired conditions, such as a power outage for the system 500 or other event that prevents digital communications via and through the system 500. The switch 504 is connected to the analog POTS network 102 via the jack 106. The switch 504 is also connected by a bypass circuit 402 to the telephone 108 or other analog input device.

In operation, upon a loss of electrical power or other loss or corruption of digital communications access by the system 500, the switch 504 enables power to the bypass circuit 502 from the power input 502. Then, the telephone 108 makes and receives analog voice calls, via the bypass circuit 502, to and from the jack 106 and POTS network 102.

Numerous variations and alternatives are possible in the systems and methods described herein. As has been previously mentioned, although the interface device 110 and each of the systems 200, 300, 400, 500 are illustrated as comprising a unit comprised of a circuit board, elements, and housing, separate and distinct elements are possible and are intended included in the description. Further, although the devices and systems are described with reference to VoIP communications, the same and similar concepts and features are applicable to other instances in which a limited communications bandwidth is capable of being shared by multiple users and applications. In any such event, the devices and systems can serve to favor certain users and applications, such as VoIP calls, over other communications that are concurrently attempted within networks and connections. Of course, other and different installations, configurations, and applications for the systems and devices are possible in keeping with the intentions, concepts and operations described herein.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for communicatively connecting a first communication device and a second communication device to comprising:
    an adapter device communicatively connected to the first communication device and the second communication device;
    a link of limited communicative bandwidth, the link communicatively connected to the adapter device and the digital packet-switched network, the bandwidth of the link is shared by the first communication device and the second communications device for communication over the digital packet-switched network;
    a bandwidth limiter connected to the adapter device and to the second communication device, the bandwidth limiter, if operationally switched "on", restricting the bandwidth of the link available to the second communication device and, if operationally switched "off", not restricting the bandwidth of the link available to the second communication device; and a switch connected to the bandwidth limiter and to the first communication device, for detecting communications by the first communication device and (i) operationally switching "on" the bandwidth limiter if the first communication device requires greater portion of the bandwidth for communications of the first communication device over the link with the digital packet-switched network and (ii) operationally switching "off" the bandwidth limiter if the bandwidth can then accommodate communications of the first communication device and the second communications device, in combination, over the link with the digital packet-switched network;

wherein the system optimizes usage of the bandwidth of the link by preferentially accommodating communications of the first communication device requiring greater of the bandwidth.

2. The system of claim 1, further comprising:

a modem connected to the adapter device and the first communication device, the first communication device is an analog communication device and the modem modulates analog signals of the first communication device to the link and demodulates digital signals of the first communication device from the link;

wherein the switch operationally turns "on" the bandwidth limiter in response to the analog communication device actively communicating analog signals, and the bandwidth limiter restricts the bandwidth available to the second for each at least one other communication device.

3. The system of claim 2, further comprising:

a bypass link connected to the first communication device, for communications of the first communication device if the digital packet-switched network is inaccessible for communications of the first communication device.

4. The system of claim 3, wherein a distinct telenumeric dial code of the first communication device accesses the bypass link for communications of the first communication device.

5. The system of claim 4, further comprising:

a second switch connected to the first communication device and the bypass link;

a power source connected to the second switch;

wherein the second switch communicatively connects the first communication device with the bypass link, for communications over the bypass link by the first communication device upon an event affecting the digital packet-switched network.

6. The system of claim 5, wherein the event is a failure of access to the digital packet-switched network by the first communication device.

7. The system of claim 4, wherein the distinct telenumeric dialcode is selected from the group consisting of: "911", "0", and other telenumeric code to access PSTN services.

8. A method of communications with a digital packet-switched network, comprising the steps of:

communicating a first signal to an adapter device connected to a bandwidth limiter, the adapter device is connected to a link connected to the digital packet-switched network for communication of the first signal between the adapter device and the digital packet-switched network, the link has a finite maximum bandwidth:

communicating the first signal over the link by the adapter device;

communicating a voice call to the an adapter device, the voice call requires a voice bandwidth portion of the finite maximum bandwidth for communication of the voice call between the adapter device and the digital packet-switched network on the link;

detecting by the adapter device the voice call of the step of communicating the voice call;

controlling the bandwidth limiter by the adapter device, in response to the step of detecting the voice call, to restrict the step of communicating the first signal if the voice bandwidth portion of the finite maximum bandwidth is not available because of the first signal, to accommodate the voice call within the voice bandwidth portion of the finite maximum bandwidth of the link; and communicating the voice call by the adapter device over the link.

9. A method of communications over a limited bandwidth element connected to a digital packet-switched network, comprising the steps of:

receiving a non-voice data signal by an adapter connected to the limited bandwidth element;

communicating by the adapter the non-voice data signal on the limited bandwidth element with the digital packet-switched network;

receiving a voice call by the adapter connected to the limited bandwidth element, concurrent with the step of communicating by the adapter the non-voice data signal on the limited bandwidth element;

detecting by a signal limiter connected to the adapter, the voice call at the adapter limited bandwidth element from the step of receiving the voice call by the adapter;

restricting by the signal limiter the step of communicating by the adapter the non-voice data signal on the limited bandwidth element with the digital packet-switched network, if the limited bandwidth element will not concurrently accommodate both the non-voice data signal and the voice call, to preferentially accommodate the voice call on the limited bandwidth element; and communicating the voice call by the adapter on the limited bandwidth element with the digital packet-switched network.

10. The method of claim 9, further comprising the steps of:

receiving an analog voice signal representative of the voice call at the limited bandwidth element, as the step of receiving the voice call;

detecting the analog voice signal at the limited bandwidth element, as the step of detecting the voice call;

communicating the analog voice signal over the limited bandwidth element, as the step of communicating the voice call on the limited bandwidth element;

converting the analog voice signal to a digital data representative of the voice call, after the step of communicating the analog voice signal over the limited bandwidth element; and transmitting the digital data representative of the voice call over a digital packet-switched network by the limited bandwidth element;

wherein the step of restricting is performed in response to the step of detecting the analog voice signal at the limited bandwidth element if the limited bandwidth element will not concurrently accommodate both the non-voice data signal and the analog voice signal, to preferentially accommodate the analog voice signal on the limited bandwidth element at the narrow bandwidth;

wherein the step of restricting continues for duration of the step of the step of detecting the analog voice signal at the narrow bandwidth element.

11. The method of claim 9, further comprising the step of:
receiving a VoIP signal representative of the voice call at the limited bandwidth element, as the step of receiving the voice call;
detecting the VoIP signal at the narrow bandwidth element, as the step of detecting the voice call;
communicating the VoIP signal over the limited bandwidth element, as the step of communicating the voice call on the limited bandwidth element; and
converting the VoIP signal to an audible representation of the voice call, after the step of communicating the VoIP signal over the limited bandwidth element;
wherein the step of restricting is performed in response to the step of detecting the VoIP signal at the limited bandwidth element if the limited bandwidth element will not concurrently accommodate both the non-voice data signal and the VoIP signal, to preferentially accommodate the VoIP signal on the limited bandwidth element.

12. The method of claim 9, further comprising the steps of:
bypassing the step of restricting by the limited bandwidth element the step of communicating the non-voice data signal on the limited bandwidth element, if the voice call cannot be made through the limited bandwidth element by performing the step of restricting; and
transmitting the voice call, upon the step of bypassing, over a bypass link distinct from the limited bandwidth element upon the step of bypassing.

13. The method of claim 12, further comprising the step of:
detecting a failure event of the limited bandwidth element for the step of communicating the voice call on limited bandwidth element;
performing the step of bypassing upon the failure event of the narrow bandwidth element.

* * * * *